No. 794,396. PATENTED JULY 11, 1905.
W. DALY.
FARM IMPLEMENT.
APPLICATION FILED DEC. 30, 1903.

2 SHEETS—SHEET 1.

Witnesses
Inventor
Wm. Daly
Attorneys

No. 794,396. PATENTED JULY 11, 1905.
W. DALY.
FARM IMPLEMENT.
APPLICATION FILED DEC. 30, 1903.

2 SHEETS—SHEET 2.

Witnesses
Inventor
Wm. Daly
By
Attorneys

No. 794,396. Patented July 11, 1905.

UNITED STATES PATENT OFFICE.

WILLIAM DALY, OF WALHALLA, NORTH DAKOTA.

FARM IMPLEMENT.

SPECIFICATION forming part of Letters Patent No. 794,396, dated July 11, 1905.

Application filed December 30, 1903. Serial No. 187,157.

*To all whom it may concern:*

Be it known that I, WILLIAM DALY, a citizen of the United States, residing at Walhalla, in the county of Pembina, State of North Dakota, have invented certain new and useful Improvements in Farm Implements; and I do hereby declare the following to be a full, clear, and exact description of the invention, such as will enable others skilled in the art to which it appertains to make and use the same.

This invention relates to farm implements; and it has for its object to provide a roller for use in connection with a gang-plow and which may be connected to follow directly behind the plow to roll the furrows as they are formed, a further object of the invention being to provide a roller of such specific construction as will permit it to be used upon the damp earth in the manner described.

Figure 1:
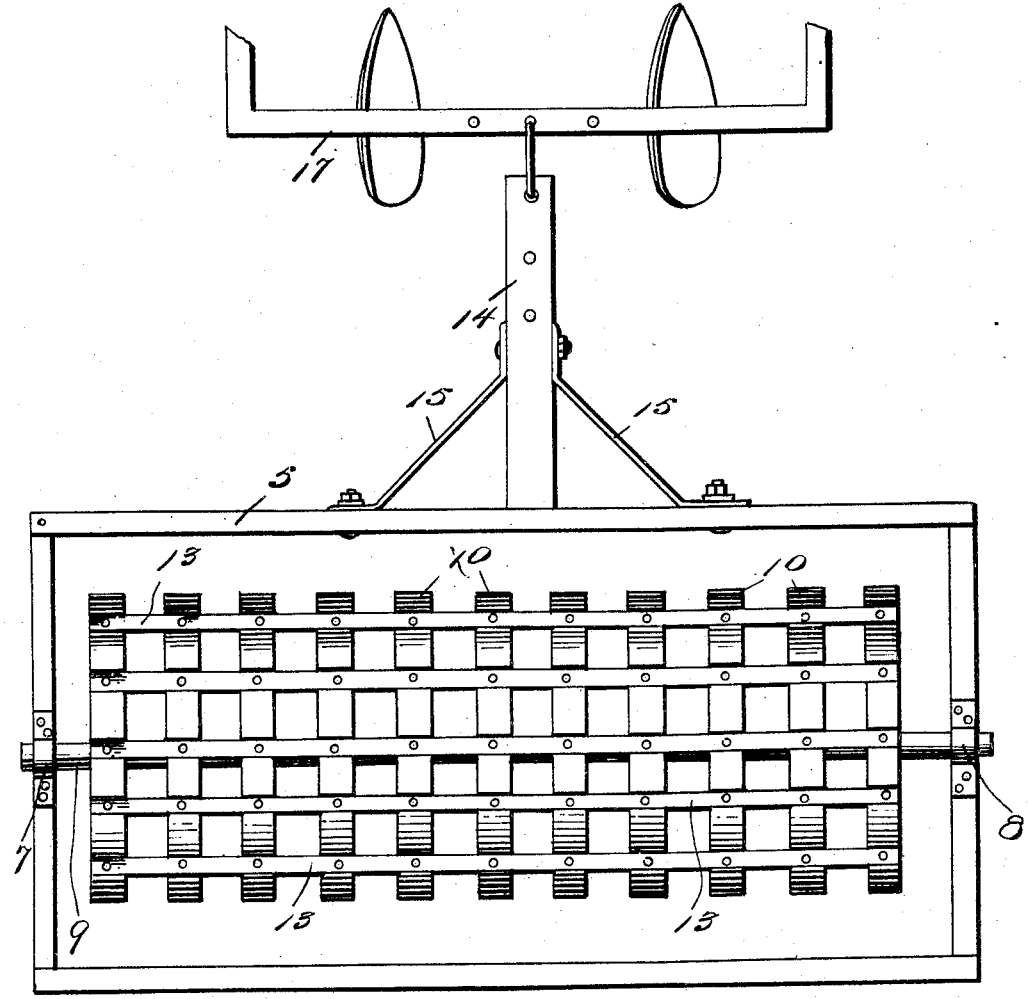
Figure 2:
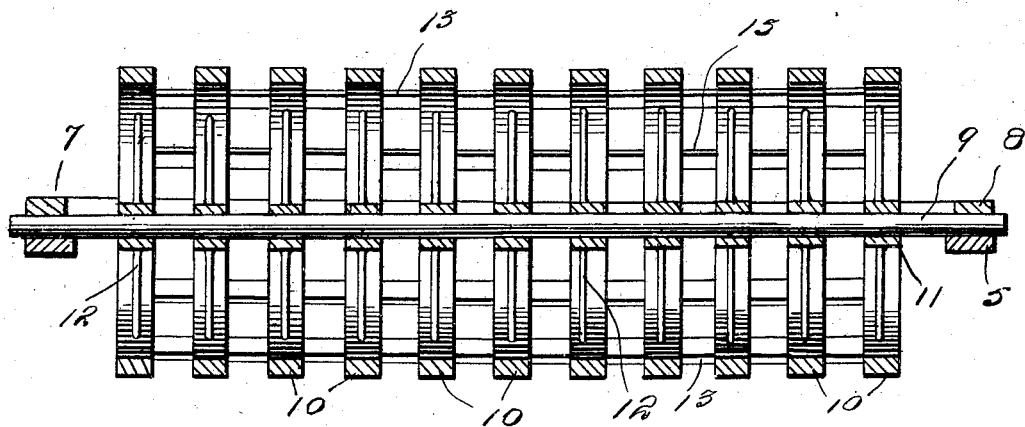
Figure 3:
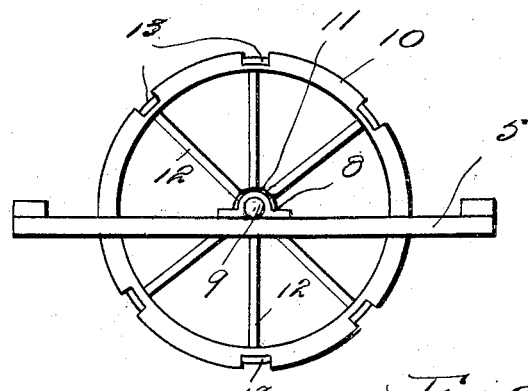

In the drawings forming a portion of this specification, and in which like numerals of reference indicate similar parts in the several views, Figure 1 is a top plan view showing the roller connected with the gang-plow. Fig. 2 is an end elevation of the roller and its frame. Fig. 3 is a section taken longitudinally through the roller and its frame.

Referring now to the drawings, there is shown a rectangular frame 5, at the ends of which are the journal-boxes 7 and 8, in which is received a shaft 9 of the roller. The roller proper comprises a series of annular rings 10, each connected to its hub 11 by means of spokes 12, and these hubs are mounted upon the shaft above mentioned. Connected to the rims and parallel with the shaft are rods 13, which are spaced apart a suitable distance and which lie in notches in the rims, so that the latter projects slightly beyond them and in connection with the rods form a network, so that the face of the roller has rectangular openings therethrough.

Attached to the front of the frame 5 is a tongue 14, having suitable braces 15, and which tongue is adapted for connection to the rear of a gang-plow, which latter is illustrated at 17.

In the use of the implement the furrows that are turned up by the plow are rolled by the roller, which, by reason of its peculiar construction, serves to break up the lumps and give a comparatively smooth surface to the ground. Furthermore, by attaching the roller to the gang-plow the rolling operation is performed at the same time as the plowing and the draft-animals do not have to walk upon the plowed ground in drawing the roller, so that by using a sufficient number of animals to compensate for the increased draft required by the roller the added number of animals is not so great as the number of animals required to draw the roller separate from the plow.

In practice modifications of the specific construction shown may be made and any suitable materials and proportions may be used for the various parts without departing from the spirit of the invention.

What is claimed is—

A farm implement comprising a roller including a plurality of laterally-spaced annular rims having rectangular-shaped recesses in their peripheries which aline in series longitudinally of the roller, a flat bar engaging in each series of recesses with one of their flat sides flush with the bottom of the corresponding recesses, the intervening portions of the peripheries of the rims projecting beyond the upper face of the bars, a shaft, hubs mounted upon the shaft, and spokes engaged with each hub and having their ends engaged through the corresponding rim and the bars in the recesses of the latter, the bars and rims being constructed and arranged with respect to each other to form rectangular openings in the roller.

In testimony whereof I affix my signature in presence of two witnesses.

WILLIAM DALY.

Witnesses:
 A. C. WAGNER,
 ALEX MCFADDEN.